United States Patent [19]
Kamitani et al.

[11] Patent Number: 4,999,658
[45] Date of Patent: Mar. 12, 1991

[54] VIEWFINDER OF THE REAL IMAGE TYPE

[75] Inventors: Masatoshi Kamitani; Toshihiro Fujiwara, both of Osaka, Japan

[73] Assignee: Minolta Camera Kabushiki Kaisha, Osaka, Japan

[21] Appl. No.: 315,941

[22] Filed: Feb. 24, 1989

[30] Foreign Application Priority Data

Feb. 27, 1988 [JP] Japan ................................. 63-45282
Feb. 27, 1988 [JP] Japan ................................. 63-45283
Mar. 4, 1988 [JP] Japan ................................. 63-52380
May 16, 1988 [JP] Japan ................................ 63-116897

[51] Int. Cl.⁵ ............................................. G03B 13/08
[52] U.S. Cl. .................................................... 354/225
[58] Field of Search ............... 354/219, 220, 221, 222, 354/223, 224, 225, 155, 199, 200, 201

[56] References Cited

U.S. PATENT DOCUMENTS

| | | | |
|---|---|---|---|
| 2,909,109 | 10/1959 | Back | 354/221 X |
| 3,476,011 | 11/1969 | Mitchell | 354/225 X |
| 4,104,663 | 8/1978 | Yamazaki et al. | 354/219 X |
| 4,119,982 | 10/1978 | Imura et al. | 354/155 |

FOREIGN PATENT DOCUMENTS 50-4326 2/1975 Japan .

Primary Examiner—Brian W. Brown
Attorney, Agent, or Firm—Willian Brinks Olds Hofer Gilson & Lione

[57] ABSTRACT

A viewfinder of the real image type which is compact and high in performance and especially in dust-proof performance and can be produced at a low cost. The viewfinder comprises an indication mask for making an in-viewfinder indication on or near an image forming plane of an objective. The indication mask is disposed in an enclosed spacing defined by an eyepiece, the objective, and first and second mirror holders coupled airtight to each other. First to fourth mirrors are disposed in the enclosed spacing at positions corresponding to reflecting faces of a Porro prism of a Keplerian viewfinder system. The first and fourth mirrors are securely mounted or formed on the first mirror holder while the second and third mirrors are securely mounted on the second mirror holder. The objective and the eyepiece are provided airtight on the first mirror holder in an opposing relationship to the first and fourth mirrors, respectively. Light introduced in via the objective is reflected successively by the first to fourth mirrors in the enclosed spacing, and an image formed by the light is observed by way of the eyepiece.

13 Claims, 14 Drawing Sheets

VIEWFINDER OF THE REAL IMAGE TYPE

BACKGROUND OF THE INVENTION

1. Field of the Invention

This invention relates to a viewfinder of the real image type.

2. Description of the Prior Art

A camera of the lens shutter type which is compact in size and low in cost conventionally employs an inverted Galilean viewfinder of the virtual image type. A conventional viewfinder of the Albada type (inverted Galilean type) which is used frequently for cameras of the lens shutter type is schematically shown in FIG. 20. Referring to FIG. 20, the viewfinder shown includes an objective 101 and an eyepiece 102 which are disposed such that a virtual image of an object for photographing may be made at a position spaced by about one meter or so from a photographer so as to enable the object to be observed by the photographer. In order to enable a photographing range or a distance measuring range to be observed together with such object by the photographer, a virtual image of a pattern of a photographing range or a distance measuring range which is drawn on a transparent member (field frame) 103 is made, using a reflecting mirror 104 and the eyepiece 102, at a position substantially the same as the position at which the virtual image of the object is made. Such a viewfinder optical system as described just above, however, is disadvantageous in that when an object is very bright or very dark, the photographing range or distance measuring range cannot be observed readily and additionally the photographer cannot observe the photographing range and the distance measuring range clearly because the diopter of the eyepiece 102 does not coincide with the field frame 103.

For indication of exposure information or some other information in such an inverted Galilean viewfinder as described above, it has been proposed to cause a light source to emit light in a light path in the viewfinder. FIG. 21 schematically shows such a proposed viewfinder wherein a light source 106 such as a light emitting diode is disposed between a reflecting mirror 104 and an eyepiece 102. With the viewfinder, however, since the light source 106 is not positioned at a focus of an eye of a photographer, information cannot be discriminated depending upon a configuration but must be discriminated only depending upon a color of the light source 106. Accordingly, the viewfinder is disadvantageous in that indication only of a limited amount of information can be attained and contents of such information cannot be readily recognized visually.

Another proposal has been made to improve such disadvantages of the conventional viewfinder as described just above. Such proposed viewfinder is schematically shown in FIG. 22 and includes a mask member 107 which is positioned at a diopter conforming to a field frame 103. Light is projected from a light source 106 located at the back of the mask member 107 so as to indicate exposure information or some other information as an image to a photographer. The improved viewfinder, however, is still disadvantageous in that, where such image is indicated within a field limiting frame 105, if the ambient light is very bright, the image cannot be observed clearly. Further, if it is attempted to indicate such information image outside the field limiting frame 105, then the size of the viewfinder must be increased as much. Besides, since the diopter does not coincide with the field limiting frame 105, such information image cannot visually look very fine.

Such disadvantages of the conventional viewfinders as described above can be eliminated where an optical system of the real image type is employed for a viewfinder. An exemplary one of such viewfinders is such a Keplerian viewfinder which employs a Porro prism as shown in FIG. 23. Referring to FIG. 23, the viewfinder shown includes an objective 101 in the form of a convex lens, a field frame 103, a Porro prism composed of two parts 108 and 109, and a pair of eyepieces 102a and 102b cooperating with each other to form a convex lens. In principle, an image made by the objective 101 is enlarged by the eyepieces 102a and 102b to facilitate observation thereof by a photographer. If the field frame 103 is placed at a position at which an image is to be formed by the objective 101, then a photographer can clearly observe both of the object image and the field frame.

With the Keplerian viewfinder, however, where the Porro prism is made of glass, they require a comparatively high production cost and have a comparatively great weight. To the contrary, where the Porro prism is made of a plastic material, they can be produced at a reduced cost, but they often have residual internal strains and are thus inferior in image forming performance.

In order to resolve the problem, it may seem recommendable to provide mirrors corresponding to reflecting faces of such Porro prism. The arrangement thus requires up to four mirrors and may require an independent mirror holder for each of such mirrors, resulting in an increase in number of parts. Also, a mechanism for adjustment of each of the mirrors in position is required, which will cause a further rise in production cost. Meanwhile, if dust should enter to a position at which an image is to be formed by the objective, it will be enlarged by the eyepiece and distrub a field of view of the photographer. Therefore, a dust-proof countermeasure is required. Where the four mirrors are held independently of each other, however, it is difficult to maintain an enclosed condition of the viewfinder.

SUMMARY OF THE INVENTION

It is an object of the present invention to provide a viewfinder of the real image type which is compact and can be produced at a low cost.

It is another object of the present invention to provide a viewfinder of the real image type which is high in performance and especially in dust-proof performance.

It is a further object of the present invention to provide a viewfinder of the real image type wherein an in-viewfinder indication is made in an image inverting optical system thereof while assuring a dust-proof performance.

In order to attain the objects, according to one aspect of the present invention, there is provided a viewfinder of the real image type having a viewfinder optical system including an image inverting optical system installed in the inside thereof such that a real image formed by an objective may be observed by way of an eyepiece of a convergent lens, the viewfinder comprising an indication mask for making an in-viewfinder indication on or near an image forming plane of the objective, the indication mask being disposed in an enclosed spacing which constitutes the image inverting optical system and is defined by a plurality of mirrors, a plurality of holders for the mirrors and a pair of light incident and light emergent members.

With the viewfinder, since the indication mask is disposed in the enclosed spacing, no dust will enter the enclosed spacing and make an obstacle to indication by the indication mask.

The viewfinder may further comprise a light introducing means made of a transparent substance and inserted in one of the mirror holders from outside of the enclosed spacing while maintaining the enclosed condition of the enclosed spacing such that a light emergent portion of the light introducing means may be located forwardly of the indication mask, and a light source located outside of the viewfinder optical system for irradiating light therefrom upon an information indicating portion of the indication mask by way of the light introducing means. With the viewfinder, indication at the information indication portion of the indication mask is made independently of brightness of external light, and an indication pattern can be clearly observed by way of the eyepiece with a similar diopter as an image formed by the objective.

According to another aspect of the present invention, there is provided a viewfinder of the real image type which comprises a first structural member in the form of a box of the double-sided roof type having a triangular shape in side elevation and opened at a side opposing to the two roofs thereof, a second structural member having a pair of shed roofs inclined in opposite directions to each other and opened at three mutually perpendicular sides thereof in an opposing relationship to the shed roofs thereof, the second structural member being mounted on the first structural member with one of the openings thereof joined to the opening of the first structural member such that an internal spacing may be formed by the first and second structural members, and an image inverting optical system disposed in the internal spacing, the image inverting optical system including a mirror provided on or formed by an inner face of each of the four roofs of the first and second structural members, the image inverting optical system further including a pair of transparent members disposed to close up the other two openings of the second structural member.

With the viewfinder, since the mirrors are formed as wall faces of the structural members, the accuracy in positional relationship between them is assured and they will not be displaced out of position by an impact upon the viewfinder. Besides, the viewfinder can be produced at a significantly lower cost than a conventional viewfinder which employs a Porro prism.

According to a further aspect of the present invention, there is a viewfinder of the real image type which comprises a first mirror holder in the form of a box of the double-sided roof type having a triangular shape in side elevation and opened at a side opposing to the two roofs thereof, a second mirror holder formed from a pair of boxes of the shed roof type connected at side faces thereof to each other such that the shed roofs thereof may be inclined in opposite directions to each other, each of the boxes of the second mirror holder being opened at two mutually perpendicular sides thereof in an opposing relationship to the shed roof thereof, the first and second mirror holders being connected to each other with the opening of the first mirror holder joined to a pair of contiguous ones of the openings of the second mirror holder such that an internal spacing may be formed by the first and second mirror holders, each of the four roofs having a window formed therein, and an image inverting optical system disposed in the internal spacing, the image inverting optical system including a mirror fitted to close up each of the windows, the image inverting optical system further including a pair of transparent members fitted to close up the other two openings of the second mirror holder.

With the viewfinder, since the mirrors are fitted in the windows of the mirror holders, the accuracy in positional relationship between them is assured and they will not be displaced out of position by an impact upon the viewfinder. Besides, the viewfinder can be produced at a significantly lower cost than a conventional viewfinder which employs a Porro prism.

According to a still further aspect of the present invention, there is provided a viewfinder of the real image type which comprises first to fourth mirrors individually disposed at positions corresponding to reflecting faces of a Porro prism between an objective and an eyepiece of a Keplerian viewfinder system, a first mirror holder having the first and fourth mirrors securely mounted therein, the objective being provided airtight on the first mirror holder in an opposing relationship to the first mirror, the eyepiece being provided airtight on the first mirror holder in an opposing relationship to a reflecting face of the fourth mirror, and a second mirror holder having the second and third mirrors securely mounted therein, the second mirror holder being coupled airtight to the first mirror holder.

With the viewfinder, since the four mirrors are employed in place of a Porro prism of a conventional Keplerian viewfinder system, the viewfinder can be reduced in weight and can be produced at a significantly reduced cost. Besides, the inside of the viewfinder is enclosed airtight, no dust will enter the inside of the viewfinder.

The above and other objects, features and advantages of the present invention will become apparent from the following description and the appended claims, taken in conjunction with the accompanying drawings in which like reference characters designate like or corresponding parts through the several views.

DETAILED DESCRIPTION OF THE PREFERRED EMBODIMENT

Figure 1:
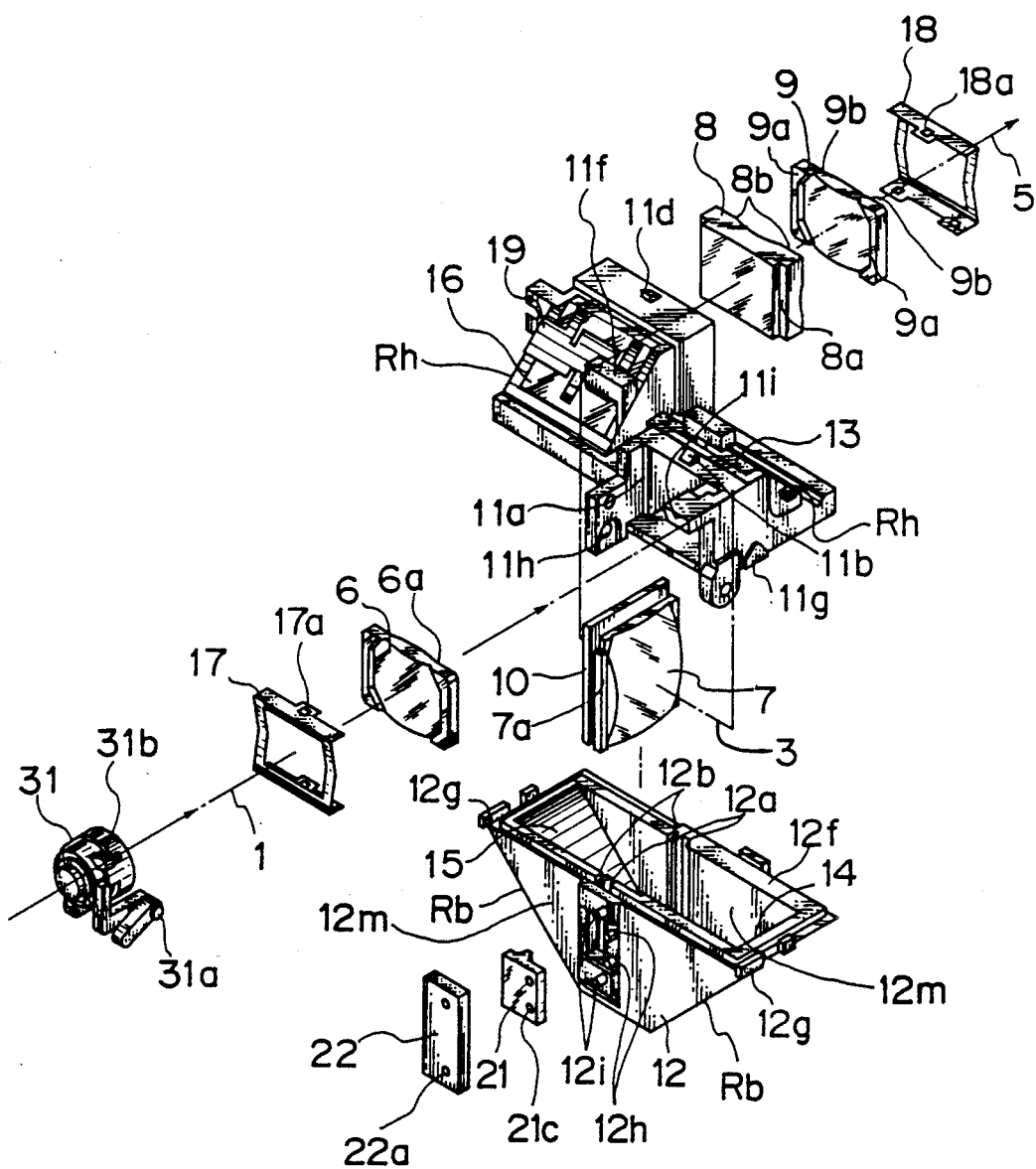
FIG. 1 is a fragmentary perspective view of a viewfinder showing a preferred embodiment of the present invention.
Figure 2:
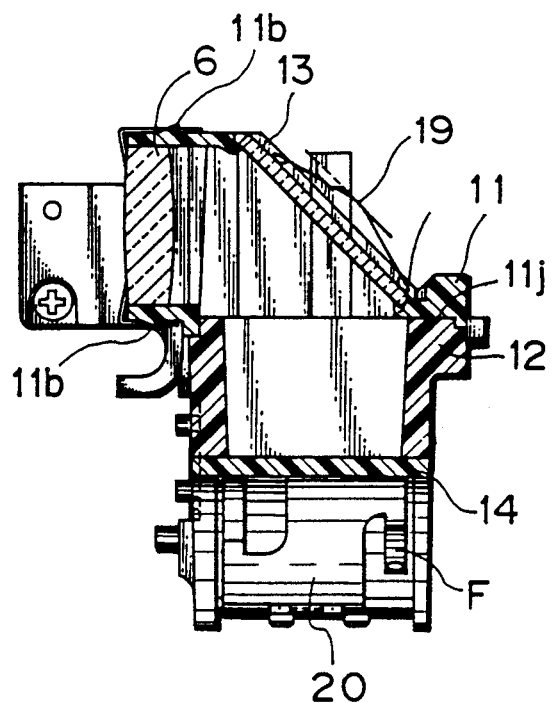
FIG. 2 is a sectional view of an objective side portion of a mirror holder of the viewfinder shown in FIG. 1.
Figure 3:
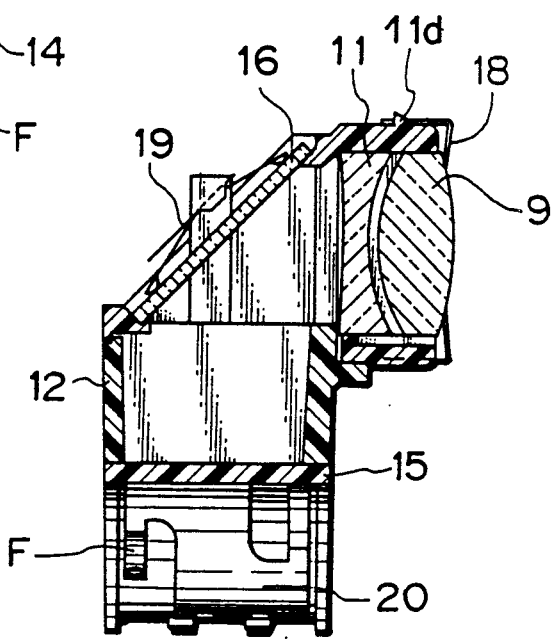
FIG. 3 is a sectional view of an eyepiece side portion of the mirror holder of the viewfinder shown in FIG. 1.

Referring first to FIG. 1, there is shown an entire optical system for a viewfinder according to the present invention. The viewfinder optical system shown has up to five optical axes 1, 2, 3, 4 and 5 along which light from an object for photographing not shown passes. The optical system includes an objective 6, a condenser lens 7, a set of eyepieces 8 and 9, and a converter lens 31 serving as an auxiliary optical system for variation of a magnification of the viewfinder optical system. The optical system further includes a field frame 10 positioned at an image plane of the objective 6, and a first mirror holder 11 in the form of a single box formed from a pair of boxes which each have a shed roof Rh inclined at an angle of 45 degrees and are connected at side faces thereof to each other such that the shed roofs Rh thereof may be inclined in opposite directions to each other. The first mirror holder 11 is entirely opened at a lower side thereof opposing to the shed roofs Rh and has two openings formed at opposite vertical sides thereof also opposing to the shed roofs Rh as shown in FIGS. 2 and 3. The objective 6 is fitted and held in an incident one of the openings of the first mirror holder 11 while the eyepieces 8 and 9 are fitted and held in the other exit opening of the first mirror holder 11. Each of the shed roofs Rh of the first mirror holder 11 has a window W (see FIG. 15) formed therein, and first and fourth mirrors 13 and 16 are fitted in the windows W of the right- and left-hand side shed roofs Rh in FIG. 1, respectively, and each held in position by means of a mirror holding spring 19 which resiliently presses against the mirror 13 or 16 from the outside as hereinafter described in detail.

Figure 4:
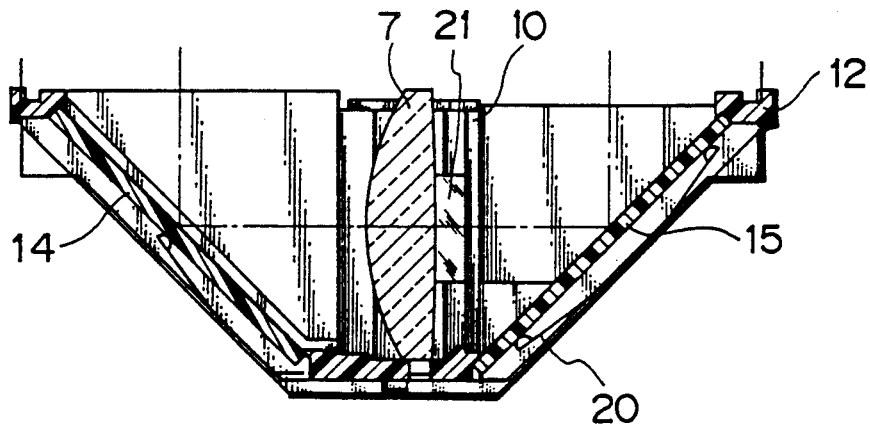
FIG. 4 is a sectional view of a condenser lens portion of the mirror holder of the viewfinder shown in FIG. 1.

Referring again to FIG. 1, the optical system further includes a second mirror holder 12 in the form of a box of the double-sided roof type which has a pair of front and rear walls 12m of a truncated inverted isosceles right-angled triangular shape and is opened at the side thereof opposing to the two roofs Rb. The opening of the second mirror holder 12 is so configured and dimensioned that it may be joined closely to the lower opening of the first mirror holder 11. Each of the two roofs Rb of the second mirror holder 12 also has a window W formed therein, and second and third mirrors 14 and 15 are fitted in the windows W of the right- and left-hand side roofs Rb, respectively, and each held in position by means of a mirror holding spring 20 (seen FIGS. 2 to 4) which resiliently presses against the mirror 14 or 15 from the outside as hereinafter described in detail.

Figure 23:
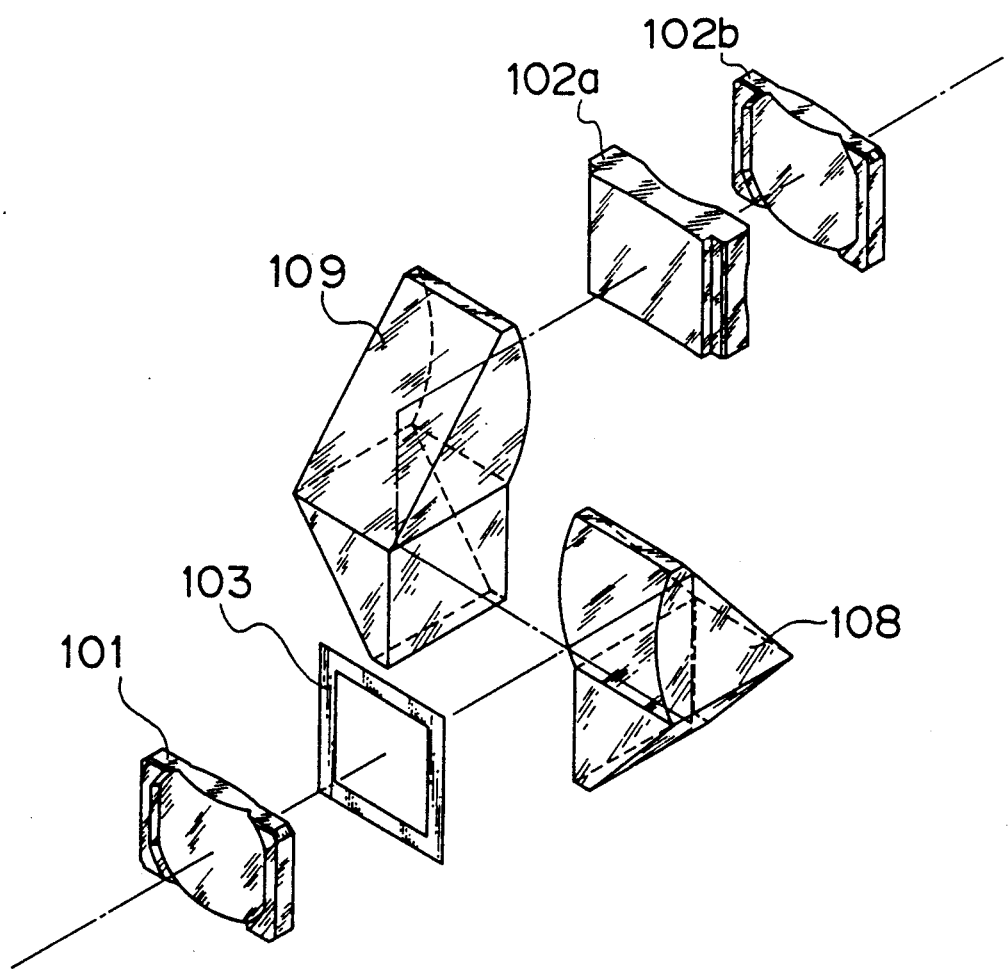
FIG. 23 is a fragmentary perspective view showing a conventional Keplerian viewfinder which employs a Porro prism.

Thus, an image inverting optical system is constituted by the four mirrors 13, 16, 14 and 15 while an enclosed spacing is defined by the four mirrors 13 to 16, first and second mirror holders 11 and 12, objective 6 and eyepieces 8 and 9. The first and fourth mirrors 13 and 16 of the image inverting optical system on the first mirror holder 11 are disposed such that reflecting faces thereof extend in planes perpendicular to each other so that light reflected from one of them may not be introduced to the other. To the contrary, the second and third mirrors 14 and 15 of the image inverting optical system on the second mirror holder 12 are disposed such that reflecting faces thereof extend in planes perpendicular to each other so that light reflected from one of them may be introduced to the other. The first mirror 13 is thus disposed at one end of the optical axis 1; the first and second mirrors 13 and 14 are disposed at the opposite ends of the optical axis 2; the second and third mirrors 14 and 15 are disposed at the opposite ends of the optical axis 3; the third and fourth mirrors 15 and 16 are disposed at the opposite ends of the optical axis 4; and the fourth mirror 16 is disposed also at one end of the optical axis 5. The first to fourth mirrors 13 to 16 thus correspond to reflecting faces of the Porro prism parts 108 and 109 of the conventional viewfinder shown in FIG. 23.

Two pairs of guide grooves 12a and 12b are formed vertically on inner faces of the front and rear walls 12m of the second mirror holder 12 at the center between the two roofs Rb, and the condenser lens 7 and the field mask 10 are fitted in the guide grooves 12a and 12b of the second mirror holder 12, respectively.

An objective holding spring 17 normally urges the objective 6 to resiliently press a pair of photographer or eyepiece side faces 6a thereof against a pair of objective receiving faces 11a of the first mirror holder 11. The objective holding spring 17 has a pair of holes 17a perforated at upper and lower portions thereof and held in engagement with a pair of projections 11b provided on the first mirror holder 11. The objective 6 is thus mounted air-tight on the first mirror holder 11 in an inclined opposing relationship by an angle of 45 degrees to the reflecting face of the first mirror 13 by means of the objective holding spring 17.

Figure 6:
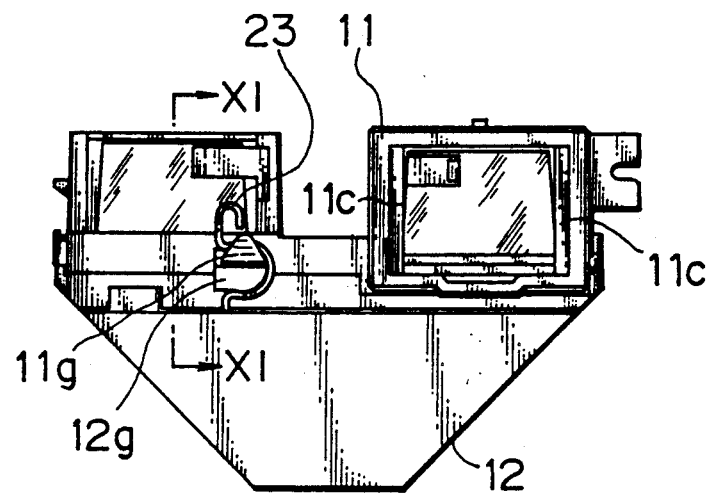
FIG. 6 is a front elevational view of the viewfinder of FIG. 1 in an assembled condition.

An eyepiece holding spring 18 normally urges the eyepieces 8 and 9 to resiliently press peripheral flat portions 8a, 8b and 9a, 9b thereof perpendicular to the optical axis 5 against a pair of eyepiece receiving faces 11c (refer to FIG. 6) of the first mirror holder 11. The eyepiece holding spring 18 has one and two holes 18a perforated at upper and lower portions thereof, respectively, and held in engagement with a pair of projections 11d provided on the first mirror holder 11. The eyepieces 8 and 9 are thus mounted air-tight on the side of the first mirror holder 11 opposite to the objective 6 in an inclined opposing relationship by an angle of 45 degrees to the reflecting face of the fourth mirror 16 by means of the eyepiece holding spring 18.

It is to be noted that while the objective 6 and the eyepieces 8 and 9 may be glass lenses, where they are formed otherwise as plastic lenses, they can be produced readily because the faces 6a, 8a, 8b and 9a, 9b can be formed at a time when they are produced by injection molding, respectively.

Figure 5:
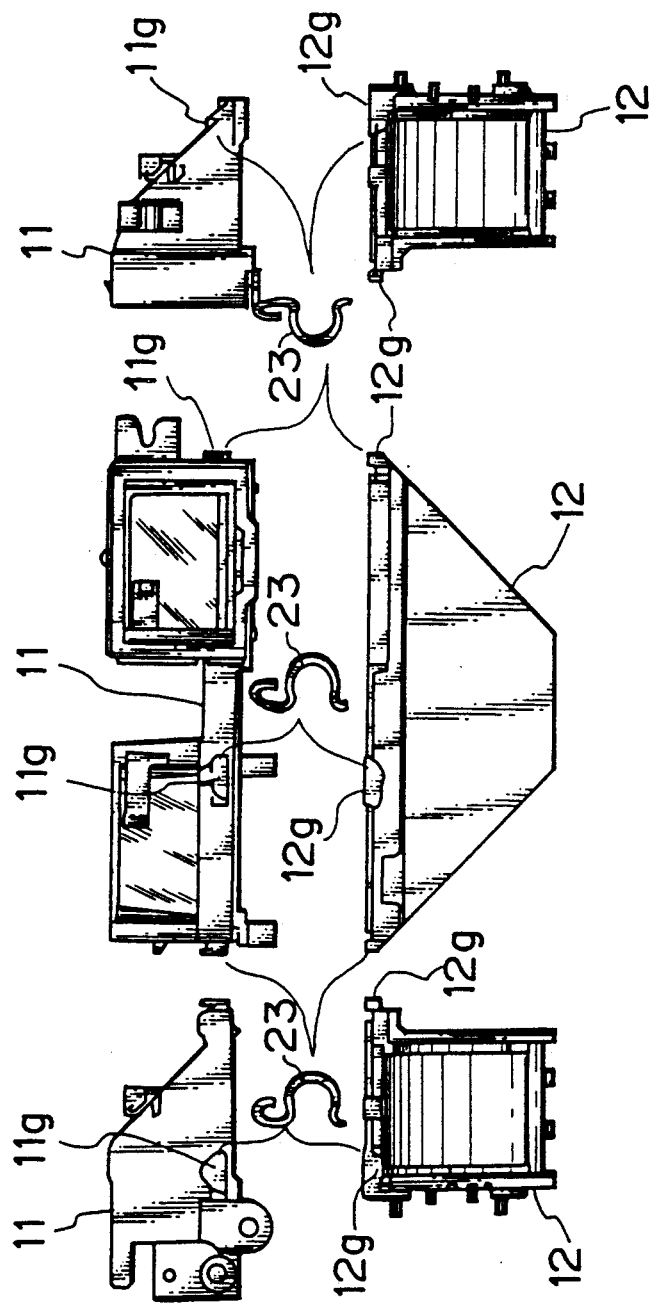
FIG. 5 is an exploded view the mirror holder of the viewfinder shown in FIG. 1 illustrating a coupling relationship between components of the mirror holder.
Figure 7:
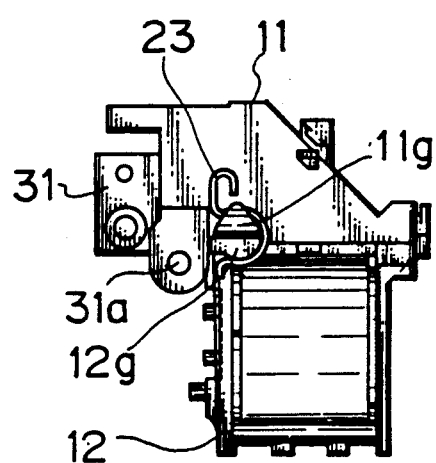
FIG. 7 is a left-hand side elevational view of the viewfinder shown in FIG. 6.
Figure 8:
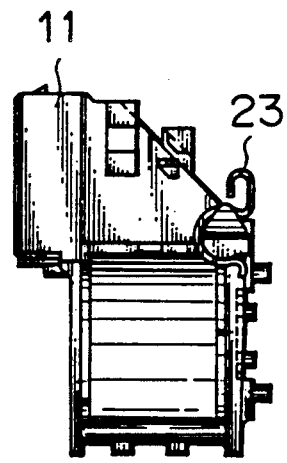
FIG. 8 is a right-hand side elevational view of the viewfinder shown in FIG. 6.

The first and second mirror holders 11 and 12 have a concave portion 11j (refer to FIG. 2) and a convex portion 12f formed on lower and upper faces thereof, respectively, and the convex and concave portions 11j and 12f are fitted with each other to couple the first and second mirror holders 11 and 12 in an air-tight condition to each other so that dust may not enter the enclosed spacing of the viewfinder after the first and second mirror holders 11 and 12 are assembled to each other. Referring also FIG. 5, the first and second mirror holders 11 and 12 further have projections 11g and 12g formed at locations on the individual four sides thereof corresponding to each other, and the projections 11g and 12g in each pair is coupled to each other by means of a retaining spring 23 in order to connect the first and second mirror holders 11 and 12 to each other as seen in front and left- and right-hand side elevational views of the viewfinder of FIGS. 6 to 8. Consequently, if external force is applied to the viewfinder after assembly, the viewfinder will not be deformed, thereby preventing possible distortion of an image of an object which may be caused by such deformation of the viewfinder.

Figure 9:
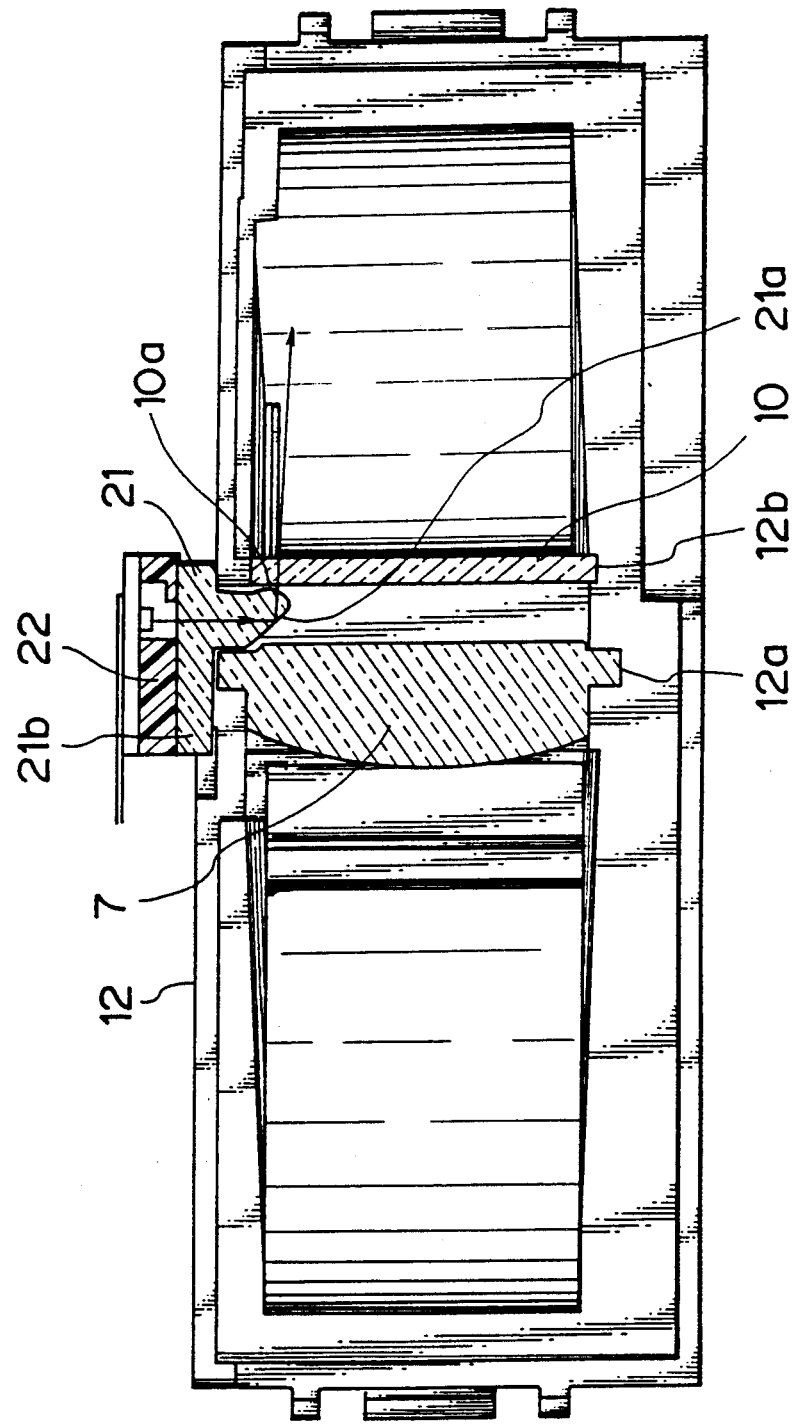
FIG. 9 is a horizontal sectional view, in an enlarged scale, of a lower portion of the mirror holder of the viewfinder shown in FIG. 1.
Figure 10:
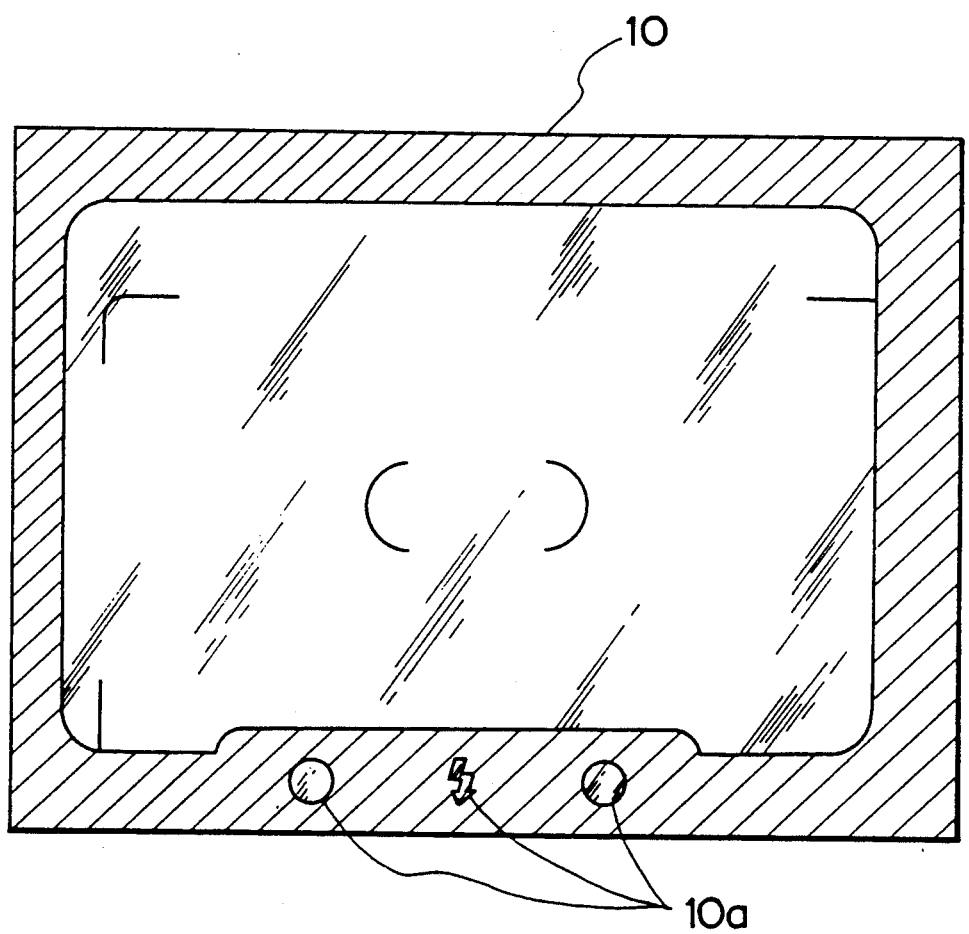
FIG. 10 is a plan view, in an enlarged scale, of a field mask of the viewfinder of FIG. 1.

Referring now to FIG. 9, there is shown an in-viewfinder indicating device incorporated in the viewfinder of FIG. 1. As described hereinabove, the condenser lens 7 and the field mask 10 are fitted in position in the two pairs of vertically extending grooves 12a and 12b formed on the opposing inner faces of the front and rear walls 12m of the second mirror holder 12 at the center between the two roofs Rb. The condenser lens 7 and the field mask 10 are actually located just at the mid position between the objective 6 and the eyepieces 8 and 9, and since the viewfinder optical system makes a telescope having a magnification equal to 1, the field mask 10 is positioned at a focal plane of the objective 6. The field mask 10 is a thin transparent plate made of glass or a plastic material and having a predetermined pattern on a surface of the plate by vacuum evaporation of metal. The field mask 10 is thus made opaque at a peripheral portion outside a field frame thereof as seen in FIG. 10, and a suitable number of, three in FIG. 10, transparent indicating portions 10a are formed at suitable locations of the peripheral portion of the field mask 10. Indication is thus given by illuminating such indicating portions 10a by an illuminating system.

The in-viewfinder indicating device further includes a light introducing member 21 made of a transparent plastic material mounted on the front side wall 12m of the second mirror holder 12. The light introducing member 21 has a shed roof-shaped prism portion 21a extended therefrom into a location between the condenser lens 7 and the field mask 10 within the second mirror holder 12, and a light source 22 which may be a light emitting diode is mounted on an outer face of the light introducing member 21. Thus, light emitted from the light source 22 is introduced into the light introducing member 21 and then totally reflected at the prism portion 21a of the light introducing member 22 to illuminate the indicating portions 10a of the field mask 10 described above.

As shown in FIGS. 1 and 9, the second mirror holder 12 has an opening formed in the front wall 12m thereof, and the prism portion 21a of the light introducing member 21 is fitted in the opening of the second mirror holder 12. The light introducing member 21 has a flange portion 21b having a greater width than the prism portion 21a and has a pair of mounting holes 21c perforated therein. A pair of bosses 12h are provided on the second mirror holder 12 and press fitted in the mounting holes 21c of the light introducing member 21 to mount the light introducing member 21 on the second mirror holder 12 such that the flange portion 21b of the light introducing member 21 covers or closes the opening of the front side wall 12m of the second mirror holder 12. Meanwhile, the illuminating light source 22 has a pair of mounting holes 22a perforated therein and is mounted on the second mirror holder 12 with a pair of bosses 12i on the second mirror holder 12 press fitted in the mounting holes 22a. The viewfinder optical system thus has an enclosed structure where the mirrors, lenses and light introducing member are assembled.

With the in-viewfinder indicating device shown in FIG. 9, light emitted from the light source 22 is reflected by the reflecting face 21a of the light introducing member 21 to illuminate the indicating portions 10a on the field mask 10.

Meanwhile, light from an object is introduced into the viewfinder by way of the objective 6 and then successively reflected by the first mirror 13 and second mirror 14 whereafter it passes the condenser lens 7 and forms an image of the object at a certain position on the field mask 10. The image thus formed is then reflected successively by the third mirror 15 and fourth mirror 16 and then passes the eyepieces 8 and 9 so that it is observed by the photographer. Consequently, the photographer can observe an erect image of an object by way of the eyepieces 8 and 9.

Figure 11:
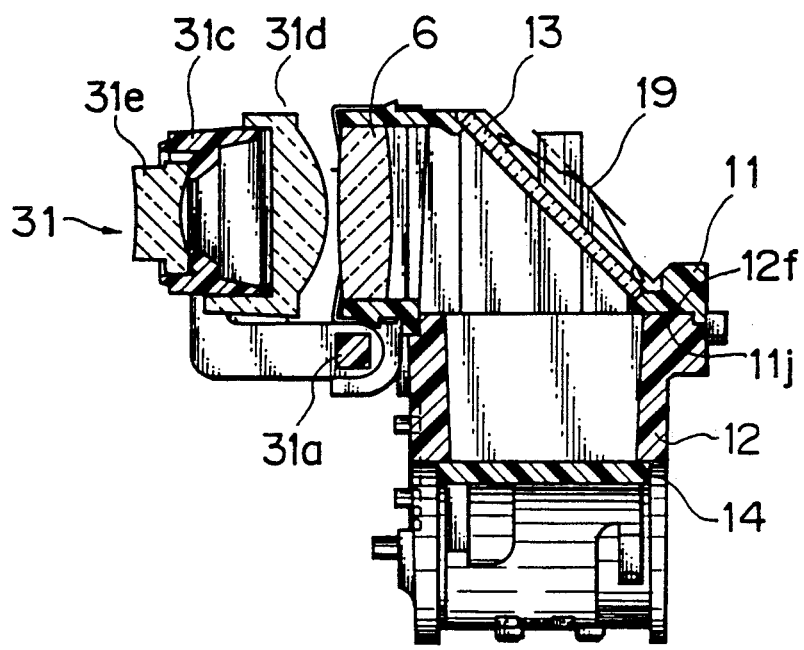
FIG. 11 is a sectional view taken along line XI—XI of FIG. 6.

Referring now to FIG. 11, the auxiliary optical system 31 is shown positioned on a light path to the viewfinder when standard photographing is to be performed with a camera on which the viewfinder is provided. Referring also to FIG. 1, the wide converter 31 serving as the auxiliary optical system which is to be inserted in the viewfinder optical system includes a pair of lenses 31d and 31e and a holder 31c for holding the lenses 31d and 31e thereon. The holder 31c has a pair of projections 31a formed on the opposite sides thereof, and the projections 31a are received in a pair of bearing portions 11h formed in the first mirror holder 11 to support the holder 31c for pivotal motion on the mirror holder 11. The holder 31c is normally urged to such an upper position as shown in FIG. 11 by a spring not shown and positioned to the upper position by a reference face 11i of the first mirror holder 11 which contacts with a projection 31b formed on the holder 31c.

Figure 12:
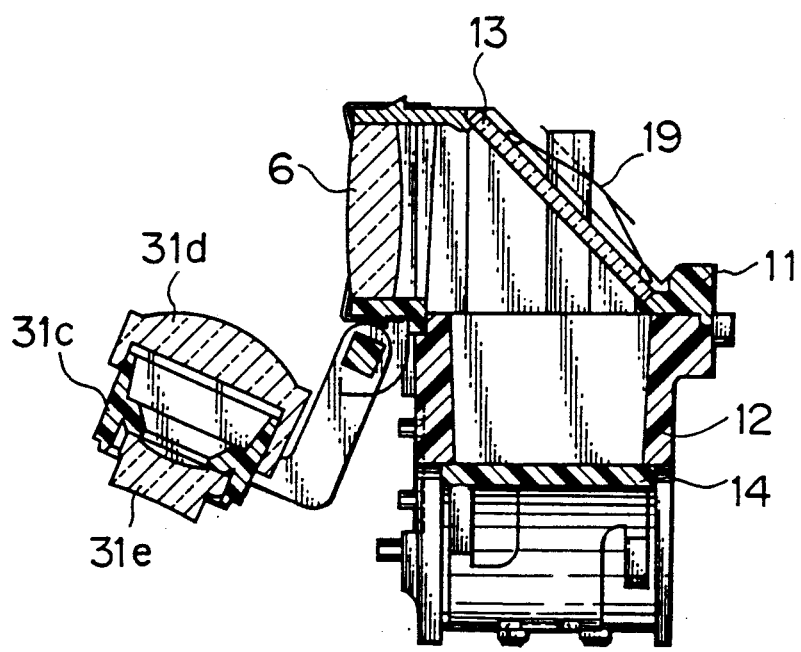
FIG. 12 is a similar sectional view but showing an auxiliary optical system of the viewfinder of FIG. 1 in a retracted condition.
Figure 13:
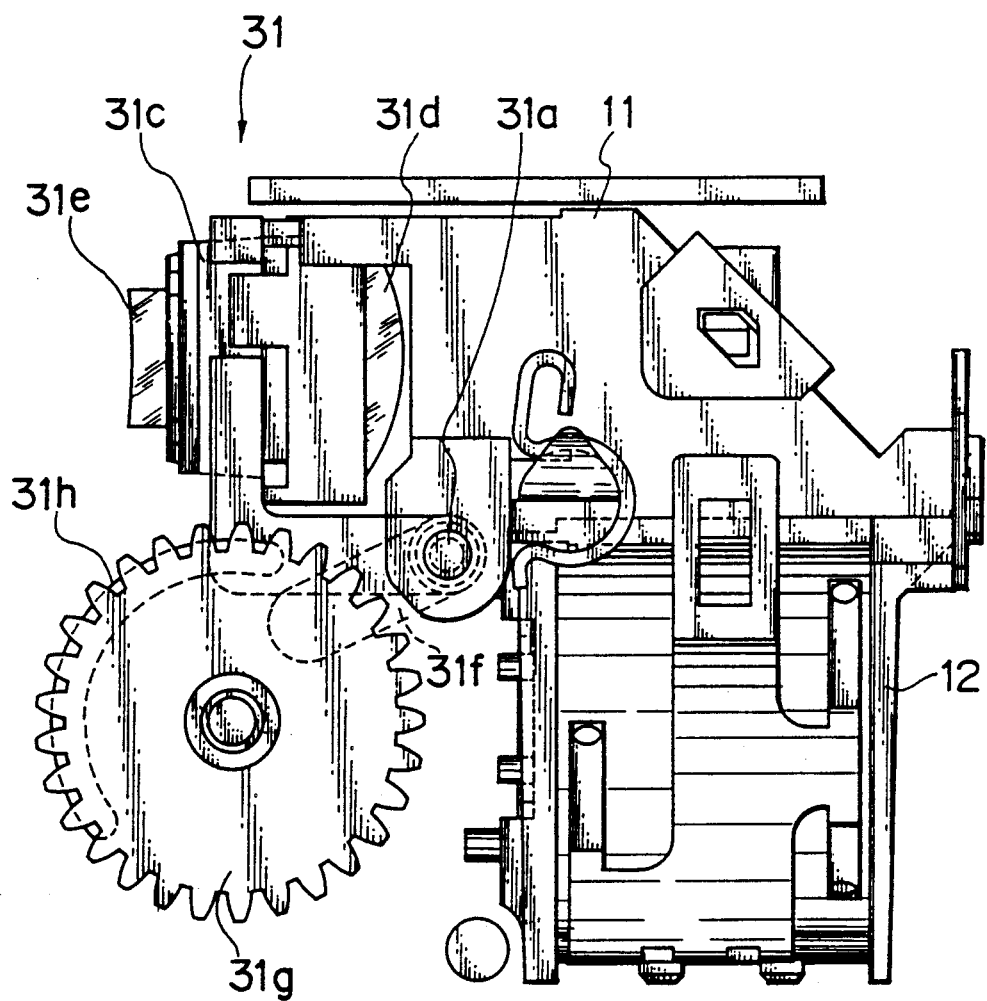
FIG. 13 is a front elevational view showing a change-over means for the auxiliary optical system shown in FIG. 12.
Figure 14:
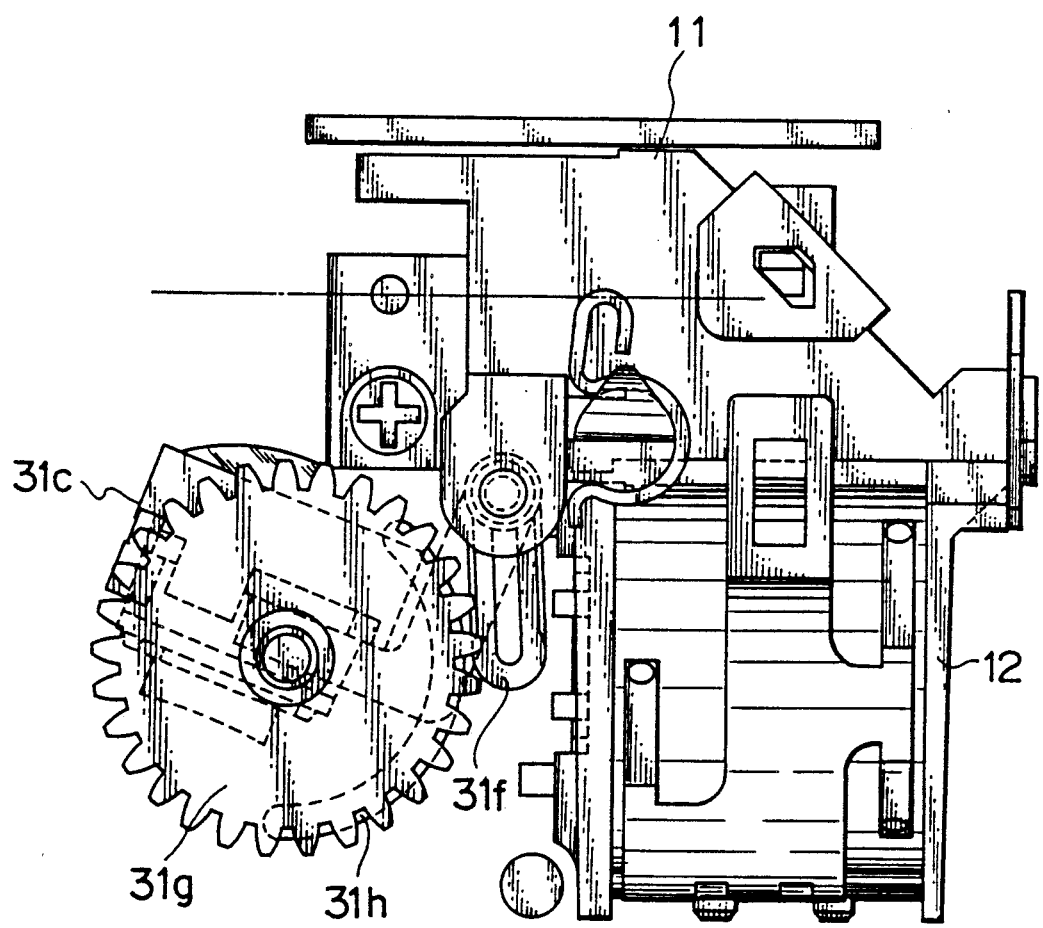
FIG. 14 is a front elevational view of the viewfinder of FIG. 1 when the auxiliary optical system shown in FIG. 12 is in the retracted condition.

Thus, if a photographing lens not shown is changed over to prepare for a tele-photographing condition, driving force from a photographing lens changing over motor not shown is transmitted to a change-over gear 31g shown in FIG. 13 to rotate the gear 31g in the clockwise direction in FIG. 13. Thereupon, an arcuate projection or rib 31h formed on an end face of the gear 31g is engaged with an arm 31f of the holder 31c to pivot the holder 31c in the counterclockwise direction in FIG. 13 around a common axis of the projections 31a to thus move the wide converter 31 out of the viewfinder light path as seen in FIG. 12 or 14, thereby establishing a tele-photographing condition.

Since the wide converter 31 as an auxiliary optical system makes an afocal optical system, the magnification of the viewfinder can be changed over by placing the wide converter 31 into or out of the position in front of the objective 6.

Figure 15:
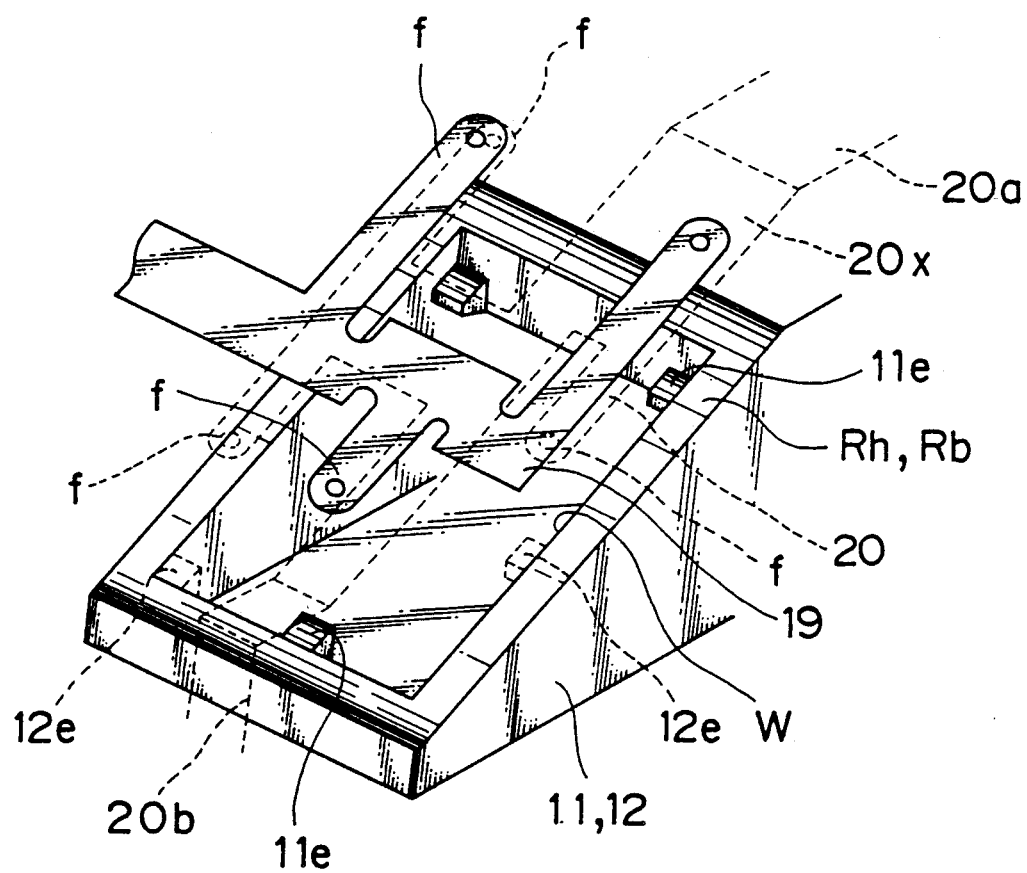
FIG. 15 is a perspective view illustrating mounting of a mirror on the mirror holder of the viewfinder of FIG. 1.

Referring now to FIG. 15, there is shown a structure for mounting a mirror 13, 16, 14 or 15 on a corresponding window of a mirror holder. The structure includes three dowels 11e or 12e formed on opposing inner faces of each of the windows W of each of the mirror holders 11 and 12. The three dowels 11e or 12e have upper faces extending in a plane parallel to the plane of the roof Rh or Rb of the mirror holder 11 or 12. The mirror 13, 16, 14 or 15 is fitted in the window W with a lower surface thereof contacted with the dowels 11e or 12e. Since each of the mirrors 13, 16, 14 and 15 is supported at three locations thereof in this manner, it can be set in position at a correct angle on the mirror holder 11 or 12 without play. In this condition, each of the mirrors 13, 16, 14 and 15 is pressed against the dowels 11e or 12e by means of a holding spring 19 or 20 so that it is secured in position on the mirror holder 11 or 12.

Each of the holding springs 19 and 20 has respective three fingers f formed thereon, and two of the three fingers f extend in a spaced relationship from a side of a main portion of the holding spring 19 or 20 while the remaining one finger f extends in the opposite direction from a location of the other side of the holding spring 19 or 20 between the two fingers f. Each of the fingers f is gradually bent a little downwardly and has a downward swell formed at the center of a free end portion thereof. Each of the springs 19 and 20 is thus contacted at the swells of the fingers f thereof with locations of a rear face of the mirror 13, 16, 14 or 15 corresponding to the dowels 11e or 12e of the mirror holder 11 or 12. Thus, each of the mirrors 13, 16, 14 and 15 is secured in position to the mirror holder 11 or 12 by mounting the holding spring 19 or 20 on the mirror holder 11 or 12 by means of a suitable mirror mounting mechanism.

The mirror mounting mechanism for the first or fourth mirror 13 or 16 is constituted such that an end portion of the main portion of the holding spring 19 is engaged with a hook-shaped projection 11f formed on the mirror holder 11 while the other end portion of the main portion of the holding spring 19 is bent downwardly and is perforated at a lower end portion of the downwardly bent portion thereof by a hole not shown in which a corresponding one of the projections 11g formed on the mirror holder 11 is engaged. Meanwhile, the mirror mounting mechanism for the second and third mirrors 14 and 15 is constituted such that the two holding spring portions 20x are connected to each other by bridge portions 20a and extends over the two roofs Rb of the mirror holder 12. Further, hook-like bent portions 20b at the opposite ends of each of the mirror holding springs 20 are engaged with projections (not shown) of the mirror holder 12.

Since each of the mirrors 13 to 16 is supported at the three dowels 11e or 12e of the mirror holder 11 or 12, it is held in position with a high degree of stability. Further, a desired accuracy in positioning relationship between the mirrors 13 to 16 can be attained readily by forming the dowels 11e and 12e with suitable vertical dimensions upon molding of the mirror holders 11 and 12. Besides, where the mirrors 13 to 16 are surface mirrors, a possible error in position of the reflecting faces thereof arising from the thickness of the mirrors can be eliminated or ignored.

Figure 16:
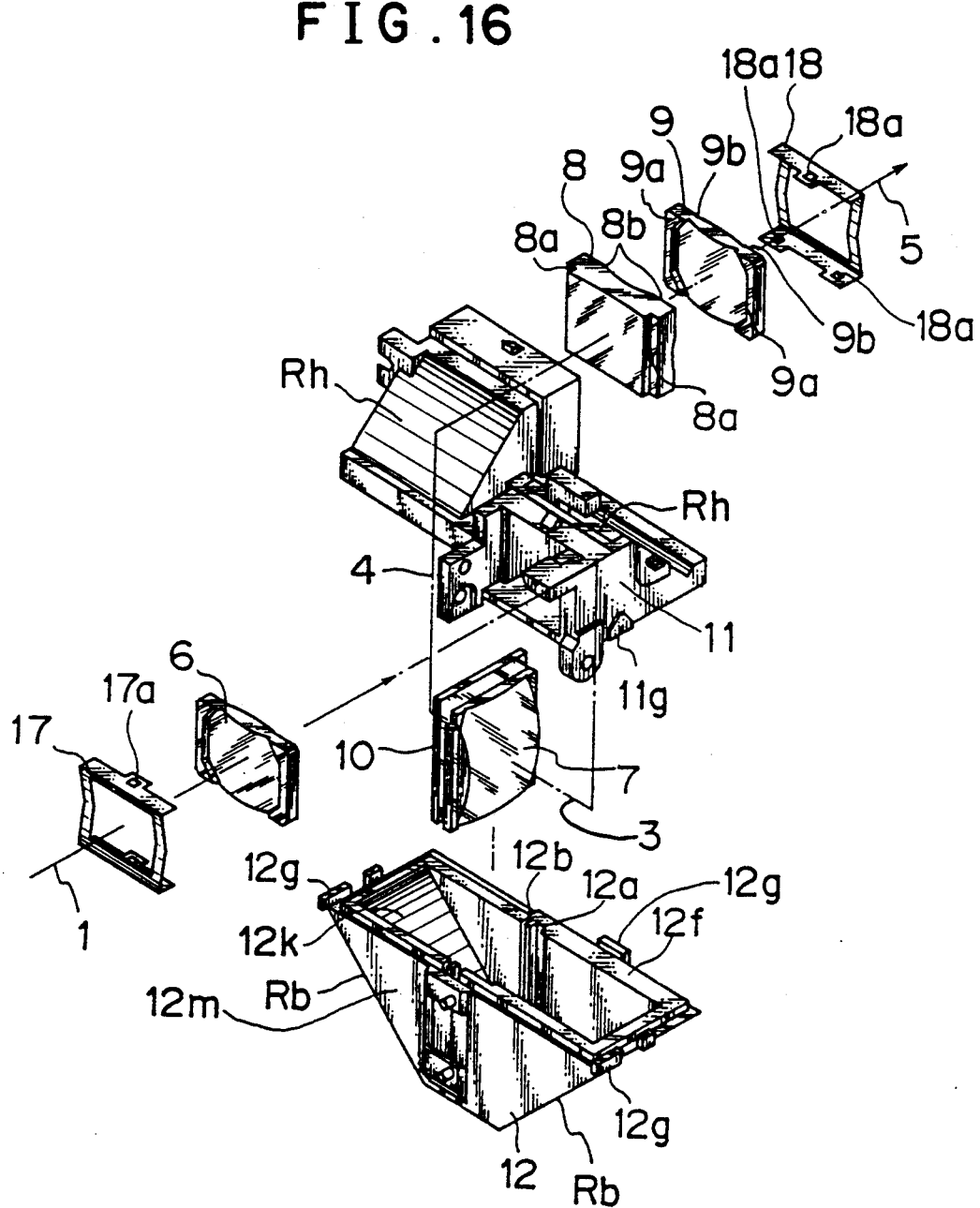
FIG. 16 is a fragmentary perspective view of a modified viewfinder.

Referring now to FIG. 16, there is shown a modification to the viewfinder shown in FIG. 1. The modified viewfinder shown in FIG. 16 has a generally similar construction to the viewfinder of FIG. 1 but is generally different in that the mirror holder 11 and the first and fourth mirrors 13 and 16 of the viewfinder of FIG. 1 are replaced by a single mirror structure 11 while the mirror holder 12 and the second and third mirrors 14 and 15 are replaced by another single mirror structure 12. Consequently, the associated mechanisms such as, for example, the mirror holding springs 19 and 20 for mounting the securing the mirrors 13, 16, 14 and 15 in position are also eliminated.

Figure 17:
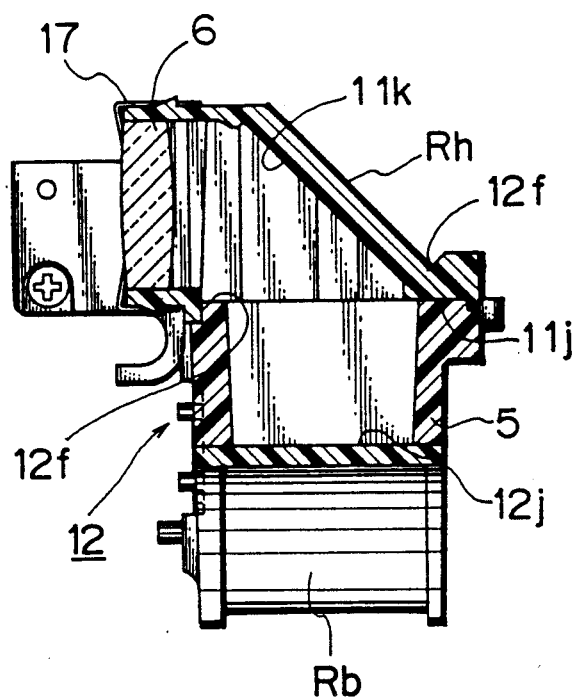
FIG. 17 is a sectional view of an objective side portion of a mirror holder of the viewfinder shown in FIG. 16.
Figure 18:
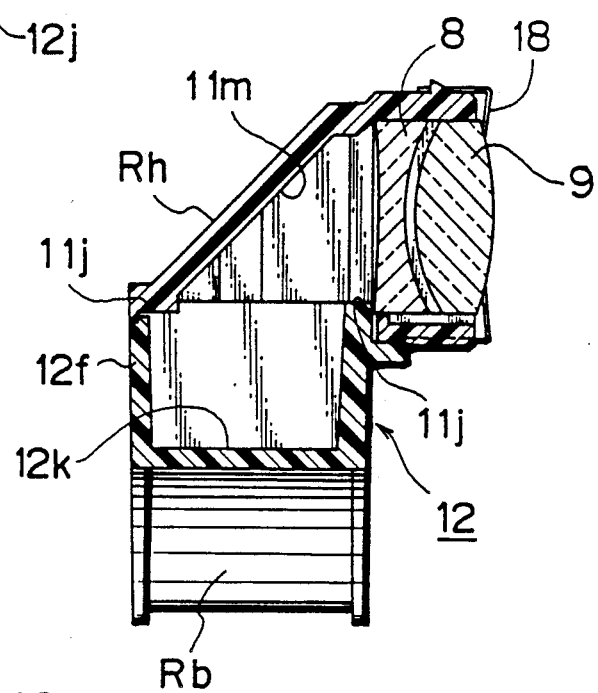
FIG. 18 is a sectional view of an eyepiece side portion of the mirror holder of the viewfinder shown in FIG. 16.
Figure 19:
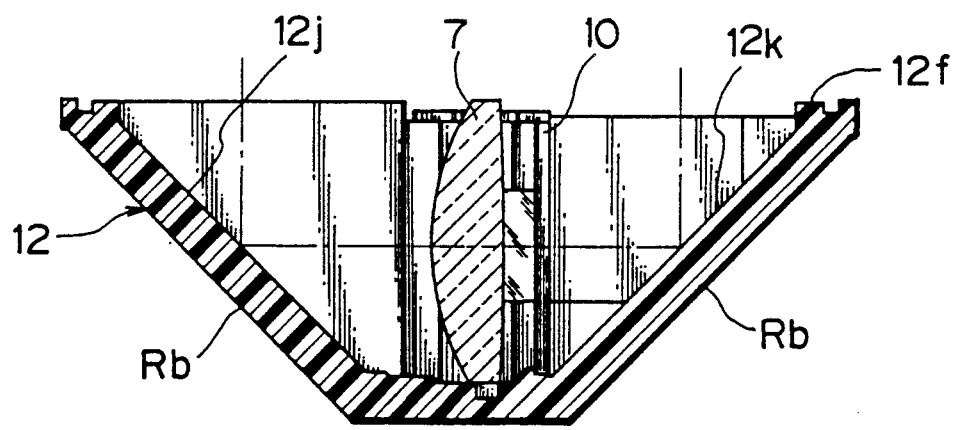
FIG. 19 is a sectional view of a condenser lens portion of the mirror holder of the viewfinder shown in FIG. 16.
Figure 20:
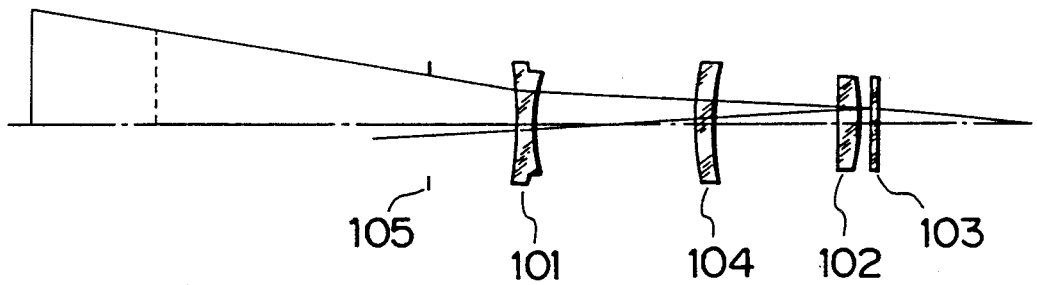
FIG. 20 is a schematic view showing a conventional inverted Galilean optical system for a viewfinder.
Figure 21:
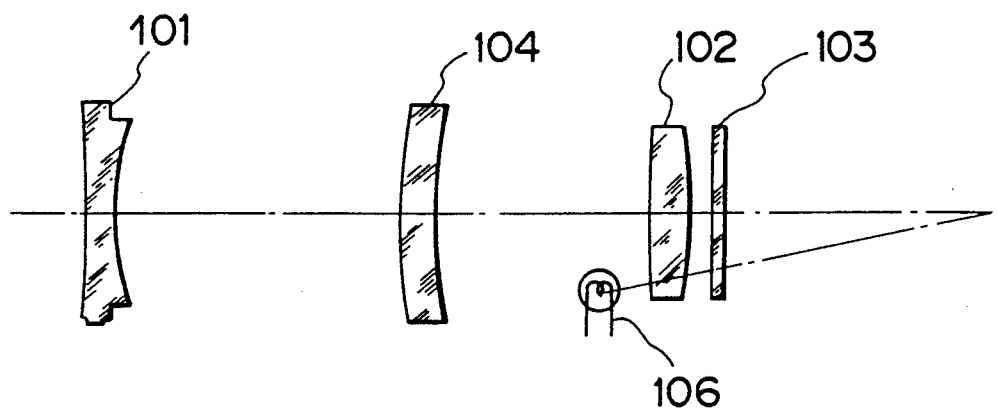
FIG. 21 is a schematic view showing another conventional inverted Galilean optical system for a viewfinder in which a light source is incorporated.
Figure 22:
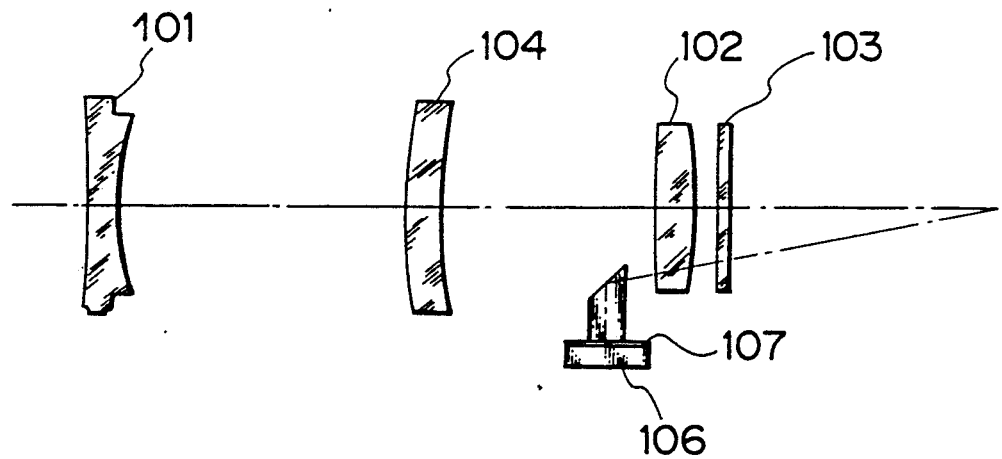
FIG. 22 is a similar view but showing a further conventional inverted Galilean optical system for a viewfinder in which a mask member is provided for a light source.

In particular, referring also to FIGS. 17 to 19, the modified viewfinder shown includes a mirror structure 11 in the form of a single member formed from a pair of boxes which each have a shed roof Rh inclined at an angle of 45 degrees and are connected at side faces thereof to each other such that the shed roofs Rh thereof may be inclined in opposite directions to each other. The mirror structure 11 is entirely opened at a lower side thereof opposing to the shed roofs Rh and have two openings formed at opposite vertical sides thereof also opposing to the shed roofs Rh as shown in FIGS. 17 and 18. Each of the shed roofs Rh of the first mirror structure 11 has a mirror formed on an inner face 11k or 11m thereof by vacuum evaporation of metal. The modified viewfinder further includes a second mirror structure 12 in the form of a member of the double-sided roof type which is opened at the side thereof opposing to the two roofs Rb. The opening of the second mirror holder 12 is so configured and dimensioned that it may be joined closely to the lower opening of the first mirror structure 11 in a similar manner as in the viewfinder shown in FIG. 1. Each of the two roofs Rb of the second mirror holder 12 has a mirror formed on an inner face 12j or 12k thereof by vacuum evaporation of metal.

It is to be noted that the mirror structure 11 may otherwise be formed as two separate members individually for the shed roofs Rb or else may be partially or entirely formed in an integral relationship with the second mirror structure 12. It is also to be noted that the auxiliary optical system 31 shown in FIG. 1 is omitted in FIG. 16.

It is further to be noted that, since the modified viewfinder is generally similar in construction to the viewfinder shown in FIG. 1 as described above, overlapping description thereof is omitted herein to avoid redundancy.

With the modified viewfinder, the mirrors are formed as wall faces of the box-like mirror structures 11 and 12. Accordingly, a desired degree of accuracy in positional relationship among the mirrors can be assured and an impact upon the viewfinder will cause no bad influence upon the accuracy. Further, the viewfinder can be produced at a significantly reduced cost compared with a conventional viewfinder which includes a Porro prism. Besides, since the viewfinder optical system is held in an enclosed condition in the viewfinder, the viewfinder optical system will not suffer from dust which may otherwise be admitted into the viewfinder.

Having now fully described the invention, it will be apparent to one of ordinary skill in the art that many changes and modifications can be made thereto without departing from the spirit and scope of the invention as set forth herein.

What is claimed is:

1. A viewfinder of the real image type having a viewfinder optical system including an image inverting optical system installed in the inside thereof such that a real image formed by an objective may be observed as an erect image by way of an eyepiece of a converging lens, comprising:
a structure for making an enclosed spacing therein having mirrors which constitute the image inverting optical system, mirror holders which hold the mirrors and a pair of light incident and light emergent members;
an indication mask, disposed in said enclosed spacing, having an information indication portion for making an in-viewfinder indication on or near an image forming plane of the objective;
a light source located outside of said viewfinder optical system for emitting light; and
a light introducing means made of a transparent substance and inserted in one of the mirror holders from outside of the enclosed spacing while maintaining the enclosed condition of the enclosed spacing such that a light emergent portion of said light introducing means may be located forwardly of said indication mask and the light from said light source is supplied upon said information indication portion.

2. A viewfinder of the real image type having
a first mirror for reflecting an incident optical flux to provide a second flux which travels in a direction perpendicular to the incident optical flux,
a second mirror for reflecting the second flux to provide a third flux which travels in a direction perpendicular to each of the incident optical flux and the second flux,
a third mirror for reflecting the third flux to provide a fourth flux which travels in a direction opposite to the second flux, and
a fourth mirror for reflecting the fourth flux to provide a fifth flux which travels in a direction parallel to the incident optical flux, comprising:
a first structural member in the form of a box having a pair of inner walls which define the second and the third mirrors perpendicular with each other and opened at its first side opposing to the inner walls for allowing the second and the fourth flux passing therethrough; and
a second structural member having a pair of inner walls which define the first and the fourth mirrors perpendicular with each other and opened at its first side opposing to the inner walls for allowing the second and the fourth flux passing therethrough, its second side for allowing the incident flux passing therethrough and its third side for allowing the fifth flux passing therethrough,
said second structural member being mounted on said first structural member under a posture in which the first mirror and the second mirror opposes with each other and the third mirror and the fourth mirror opposes with each other with the respective openings joined with each other such that an internal spacing may be formed by said first and second structural members.

3. A viewfinder as claimed in claim 2 further comprising a pair of transparent members disposed to close the openings of the second and third sides of said second structural member, respectively.

4. A viewfinder of the real image type as claimed in claim 3, wherein one of said transparent members is either one of an objective and an eyepiece which constitute a viewfinder optical system.

5. A viewfinder of the real image type as claimed in claim 4, wherein an auxiliary optical system is mounted in front of said objective for movement into or out of a path of light so as to vary the magnification of said viewfinder.

6. A viewfinder of the real image type, comprising a first mirror holder in the form of a box of a triangular shape in side elevation and having two roofs perpendicular with each other and opened at a side opposing to the two roofs thereof, a second mirror holder formed from a pair of boxes juxtaposed to each other and having respective roofs extending in planes intersecting each other such that the roofs thereof are inclined in opposite directions to each other, each of said boxes of said second mirror holder having a first opening and a second opening at two mutually perpendicular sides thereof in an opposing relationship to the roof of the box, said first and second mirror holders being connected to each other with the opening of said first mirror holder joined to said first openings of said second mirror holder such that an internal spacing may be formed by said first and second mirror holders, each of the four roofs having a window formed therein, and an image inverting optical system disposed in said internal spacing, said image inverting optical system including a mirror fitted to close up each of the windows.

7. A viewfinder as claimed in claim 6 further comprising a pair of transparent members disposed to close the second openings of said second mirror holder, respectively.

8. A viewfinder as claimed in claim 6 further comprising a group of three positioning projections disposed around one of the windows positioning the mirror fitted to close up said one of the windows.

9. A viewfinder as claimed in claim 8 further comprising an urging means for urging said mirror against said three projections.

10. A viewfinder of the real image type as claimed in claim 6, wherein an auxiliary optical system is mounted in front of said objective for movement into or out of a path of light so as to vary magnification of said viewfinder.

11. A viewfinder of the real image type as claimed in claim 7, wherein one of said transparent members is either one of an objective and an eyepiece which constitute a viewfinder optical system.

12. A viewfinder of the real image type, comprising a first mirror holder in the form of a box having two walls angularly positioned with each other and opened at a side opposing to the two walls thereof, a second mirror holder formed from a pair of boxes each having a wall connected at side faces thereof to each other such that the walls thereof are inclined in opposite directions to each other, each of said boxes of said second mirror holder being opened at two mutually perpendicular sides thereof in an opposing relationship to the walls thereof, said first and second mirror holders being connected to each other with the opening of said first mirror holder joined to a pair of contiguous ones of the openings of said second mirror holder such than an internal spacing is formed by said first and second mirror holders, each of the four walls having a window formed therein, and an image inverting optical system disposed in said internal spacing, said image inverting optical system including a mirror fitted to close up each of the windows.

13. A viewfinder of the real image type having
a first mirror for reflecting an incident optical flux to provide a second flux which travels in a direction perpendicular to the incident optical flux,
a second mirror for reflecting the second flux to provide a third flux which travels in a direction perpendicular to the second flux,
a third mirror for reflecting the third flux to provide a fourth flux which travels in a direction opposite to the second flux, and
a fourth mirror for reflecting the fourth flux to provide a fifth flux which travels in a direction parallel to the incident optical flux, comprising:
a first structural member in the form of a box having a pair of inner walls which define the second and the third mirrors perpendicular with each other and opened at its first side opposing to the inner walls for allowing the second and the fourth flux passing therethrough; and
a second structural member having a pair of inner walls which define the first and the fourth mirrors perpendicular with each other and opened at its first side opposing to the inner walls for allowing the second and the fourth flux passing therethrough, its second side for allowing the incident flux passing therethrough and its third side for allowing the fifth flux passing therethrough,
said second structural member being mounted on said first structural member under a posture in which the first mirror and the second mirror oppose with each other and the third mirror and the fourth mirror oppose with each other with the respective openings joined with each other such that an internal spacing may be formed by said first and second structural members.

* * * * *